US012031910B2

(12) United States Patent
Tae et al.

(10) Patent No.: US 12,031,910 B2
(45) Date of Patent: Jul. 9, 2024

(54) TRANSMISSION CORRECTED PLASMA EMISSION USING IN-SITU OPTICAL REFLECTOMETRY

(71) Applicant: Applied Materials, Inc., Santa Clara, CA (US)

(72) Inventors: Patrick Tae, Sunnyvale, CA (US); Zhaozhao Zhu, Milpitas, CA (US); Blake W. Erickson, Gilroy, CA (US); Chunlei Zhang, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 262 days.

(21) Appl. No.: 17/447,745

(22) Filed: Sep. 15, 2021

(65) Prior Publication Data

US 2023/0078567 A1    Mar. 16, 2023

(51) Int. Cl.
*G01N 21/55*    (2014.01)

(52) U.S. Cl.
CPC ....... *G01N 21/55* (2013.01); *G01N 2021/558* (2013.01)

(58) Field of Classification Search
None
See application file for complete search history.

(56) References Cited

U.S. PATENT DOCUMENTS

| | | |
|---|---|---|
| 4,415,402 A | 11/1983 | Gelernt et al. |
| 4,594,226 A | 6/1986 | Reedy |
| 6,025,916 A | 2/2000 | Quick et al. |

(Continued)

FOREIGN PATENT DOCUMENTS

| | | |
|---|---|---|
| CN | 111751312 A | 10/2020 |
| JP | H11288921 A | 10/1999 |

(Continued)

OTHER PUBLICATIONS

PCT Notification of Transmittal of the International Search Report and the Written Opinion of the International Searching Authority for PCT Application No. PCT/US2021/037108, dated Oct. 5, 2021, 9 pages.

(Continued)

*Primary Examiner* — Tri T Ton
*Assistant Examiner* — Jarreas Underwood
(74) *Attorney, Agent, or Firm* — Lowenstein Sandler LLP

(57) ABSTRACT

Implementations disclosed describe a system including a light source, an optical sensor, and a processing device. The light source directs, during a first time, a probe light into a processing chamber through a window. The light source ceases, during a second time, directing the probe light into the processing chamber through the window. The optical sensor detects, during the first time, a first intensity of a first light. The first light includes a portion of the probe light reflected from the window and a light transmitted from an environment of the processing chamber through the window. The optical sensor detects, during the second time, a second intensity of a second light. The second light includes the light transmitted from the environment of the processing chamber through the window. The processing device determines, using the first intensity and the second intensity, a transmission coefficient of the window.

21 Claims, 5 Drawing Sheets

(56) References Cited

U.S. PATENT DOCUMENTS

| | | | |
|---|---|---|---|
| 6,406,924 B1 * | 6/2002 | Grimbergen | H01L 22/26 438/743 |
| 7,227,624 B2 * | 6/2007 | Fink | H01J 37/32935 118/712 |
| 7,578,301 B2 | 8/2009 | Hudson et al. | |
| 7,591,923 B2 | 9/2009 | Mitrovic et al. | |
| 8,009,288 B2 | 8/2011 | Berlin et al. | |
| 8,101,906 B2 * | 1/2012 | Tallavarjula | G01J 3/443 250/252.1 |
| 8,144,328 B2 | 3/2012 | Venugopal et al. | |
| 8,513,002 B2 | 8/2013 | Berlin et al. | |
| 9,347,132 B2 | 5/2016 | Ramachandran et al. | |
| 10,008,370 B2 | 6/2018 | Ohmori et al. | |
| 10,269,545 B2 | 4/2019 | Gottscho | |
| 10,615,009 B2 | 4/2020 | Guha et al. | |
| 10,796,891 B2 | 10/2020 | Kim et al. | |
| 11,114,286 B2 | 9/2021 | Lin et al. | |
| 11,276,564 B2 | 3/2022 | Gottscho | |
| 11,499,869 B2 | 11/2022 | Lin et al. | |
| 2005/0127192 A1 | 6/2005 | Kang et al. | |
| 2005/0173239 A1 | 8/2005 | Somekh et al. | |
| 2005/0173375 A1 * | 8/2005 | Mitrovic | H01J 37/32972 216/60 |
| 2009/0218314 A1 | 9/2009 | Davis et al. | |
| 2011/0155059 A1 | 6/2011 | Egami et al. | |
| 2015/0214016 A1 * | 7/2015 | Ham | H01J 37/32972 118/712 |
| 2015/0226540 A1 | 8/2015 | Rajagopalan et al. | |
| 2016/0177449 A1 * | 6/2016 | Ohmori | H01J 37/32926 118/723 VE |
| 2018/0164215 A1 | 6/2018 | Glacer et al. | |
| 2020/0013558 A1 | 1/2020 | Hosokawa et al. | |
| 2020/0013588 A1 | 1/2020 | Lian et al. | |
| 2020/0303169 A1 | 9/2020 | Sakai | |
| 2021/0391157 A1 | 12/2021 | Tae et al. | |

FOREIGN PATENT DOCUMENTS

| | | | | |
|---|---|---|---|---|
| JP | 2003077843 A | | 3/2003 | |
| JP | 2004259768 A | | 9/2004 | |
| JP | 2005175101 A | | 6/2005 | |
| JP | 2007258238 A | | 10/2007 | |
| KR | 20080099695 A | * | 10/2008 | |
| KR | 10-2008-0099695 A | | 11/2008 | |
| KR | 20080099695 A | * | 11/2008 | |
| KR | 20110127389 A | | 11/2011 | |
| KR | 2025873 | | 9/2019 | |
| KR | 10-2182057 B1 | | 11/2020 | |
| KR | 2182057 B1 | * | 11/2020 | |
| WO | WO-2004032177 A2 | * | 4/2004 | H01J 37/32935 |
| WO | 2020142451 A1 | | 7/2020 | |
| WO | WO-2020246745 A1 | * | 12/2020 | |
| WO | 2021061541 A1 | | 4/2021 | |

OTHER PUBLICATIONS

International Search Report and Written Opinion for International Application No. PCT/US2022/043518, dated Jan. 4, 2023, 10 pages.

* cited by examiner

TRANSMISSION CORRECTED PLASMA EMISSION USING IN-SITU OPTICAL REFLECTOMETRY

TECHNICAL FIELD

Embodiments of the present disclosure generally relate to processing of samples in substrate manufacturing systems and, more specifically, to accuracy of optical measurements performed through a window into a chamber of a processing apparatus.

BACKGROUND

During manufacturing, wafers, substrates, and various other samples may undergo processing in specialized environments, such as a plasma environment during an etching process. Plasma can emit light that can be observed, e.g., through a window in a wall of the processing apparatus. The observed light can be measured using optical methods, like optical emission spectroscopy (OES) to monitor the plasma environment and the technological processes performed therein.

SUMMARY

Some of the embodiments described herein cover a system that includes a light source, an optical sensor, and a processing device. The light source may be configured to direct, during a first time, a probe light into a processing chamber through a window, and cease, during a second time, directing the probe light into the processing chamber through the window. In some embodiments, the light source may be enabled or disabled during separate collection steps. The optical sensor may be configured to detect, during the first time, a first intensity of a first light and to detect, during the second time, a second intensity of a second light. The first light may include a portion of the probe light reflected from the window and a light transmitted from an environment of the processing chamber through the window while the second light may include the light transmitted from the environment of the processing chamber through the window. The processing device may be communicatively coupled to the optical sensor and configured to determine a transmission coefficient of the window using the first intensity and the second intensity. The processing device may be further configured to determine an intensity of light incident on the window from the environment of the processing chamber using the second intensity and the transmission coefficient of the window.

Additional or related embodiments described herein cover a system that includes a processing chamber, an optical sensor, and a processing device. The processing chamber may include a window and a plasma gas within an environment of the processing chamber. The optical sensor may detect a first intensity of a first light which includes i) a portion of a probe light reflected from the window and ii) a light transmitted from the environment of the processing chamber through the window. The optical sensor may be further configured to detect a second intensity of a second light which includes the light transmitted from the environment of the processing chamber through the window. The processing device may be communicatively coupled to the optical sensor. The processing device may be configured to determine a transmission coefficient of the window using the first intensity and the second intensity.

In additional, or related embodiments, the processing device may determine the transmission coefficient and/or the reflection coefficient of the window by determining a difference between the first intensity and the second intensity. For example, an intensity of the light source may be calibrated to a reference intensity, and a ratio of the difference (between the first intensity and the second intensity) and the reference intensity may be used by the processing device to determine the reflection coefficient of the window. In some embodiments the reference intensity may be a predetermined reference intensity value. Subsequently, the processing device may determine the transmission coefficient of the window.

In further embodiments, the processing device may determine an intensity of light that is incident on the window from the environment of the processing chamber using the second intensity and the transmission coefficient of the window. In particular, once the processing device has determined the transmission coefficient, the intensity of light that is incident on the window may be determined as a ratio between the second intensity and the transmission coefficient. The environment of the processing chamber may be produced in a course of a processing operation performed in the processing chamber, and the processing device may determine a change of the transmission coefficient, caused by the processing operation, from a reference transmission coefficient of the window. The reference transmission coefficient may be determined in a similar manner as described above to determine the transmission coefficient, except that the reference transmission coefficient of the window may be determined at a stage during which the window is new and has not yet been subjected to any processing operations. In some embodiments, the environment of the processing chamber includes a plasma.

In additional, or related embodiments, the system may further include a light-coupling device to deliver the probe light from the light source to the window. In some embodiments, the light-coupling device may further deliver the first light from the window to the optical sensor. The probe light may be incident on the window at an angle which is approximately perpendicular to a surface of the window. In some embodiments, the system may further include a collimator to direct the light produced from the environment such that it may be incident approximately perpendicular to a surface of the window. In one embodiment, the probe light may be a broadband light. The system may include a light source, and optical sensor, and a processing device communicatively coupled to the optical sensor. The light source may direct, during a first time, a probe light into a processing chamber through a window of the processing chamber and may cease, during a second time, directing the probe light into the processing chamber through the window. During the first time, the optical sensor may detect a first intensity of a first light. The first light may include a portion of the probe light reflected from the window and a light transmitted from an environment of the processing chamber through the window. During the second time, the optical sensor may detect a second intensity of a second light. The second light may include the light transmitted from the environment of the processing chamber through the window.

Numerous other features are provided in accordance with these and other aspects of the disclosure. Other features and aspects of the present disclosure will become more fully apparent from the following detailed description, the claims, and the accompanying drawings.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
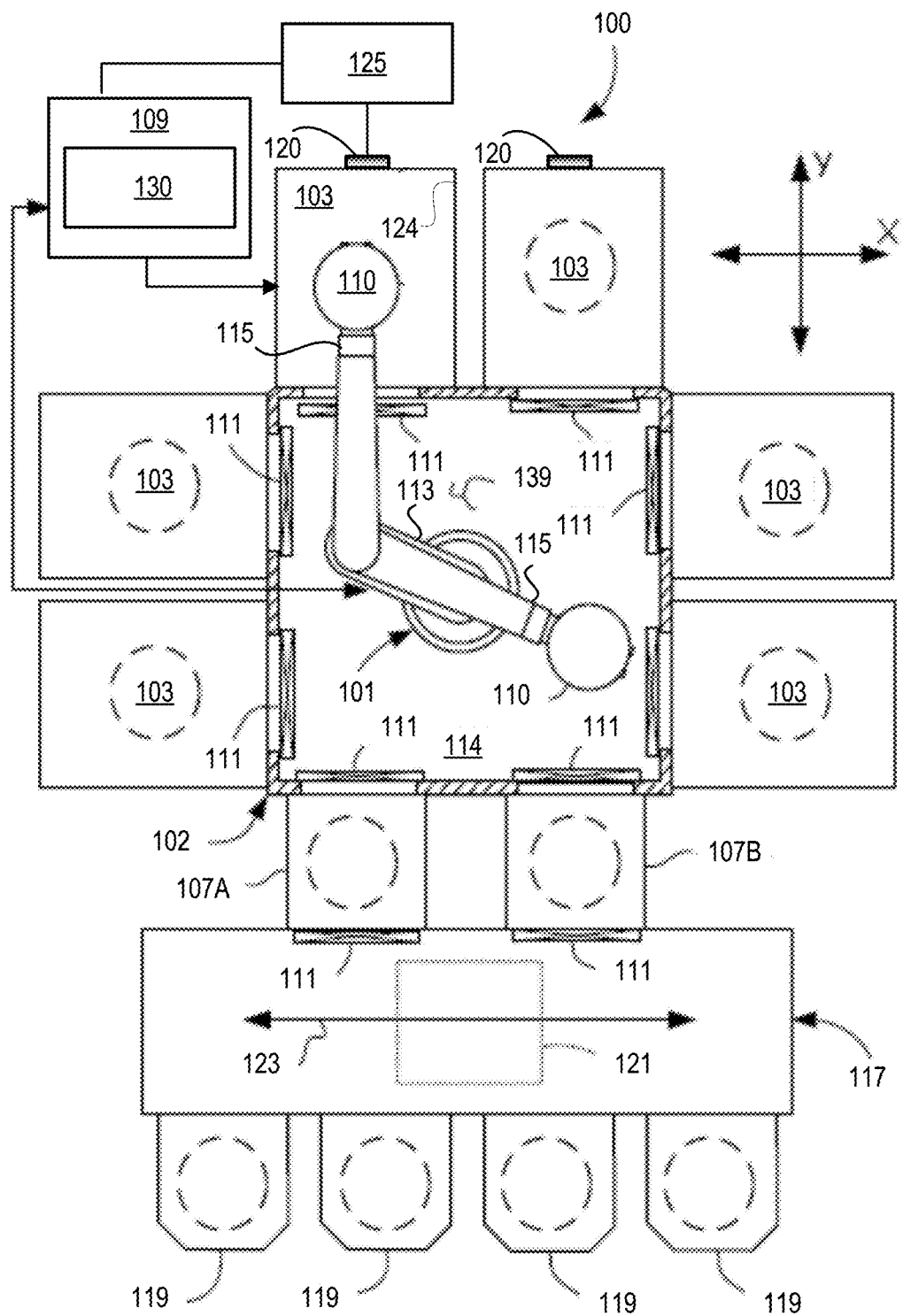
FIG. 1 is a top schematic view of an example processing system, according to an embodiment.

Intensity, spectral, polarization, and other information measured by OES provides valuable data about the environment of a manufacturing system. For example, the spectral composition of light transmitted through a window of a processing chamber can indicate whether the environment has the proper chemical composition. Accuracy of data provided by OES may be affected by drift (change) of various parameters, which may convolute the measured signal. For example, the measured signal may be affected by short timescale parameter drifts and long timescale parameter drifts. Short timescale parameter drifts may be caused by a processing operation currently performed within a processing chamber during a manufacturing process. For example, various particles present in the environment may accumulate on the inner surface of a window and affect its transparency. Such a change may be wavelength dependent. Longer timescale parameter drifts may include more permanent changes to the window of the processing chamber that occur over many manufacturing processes. Such changes may include roughening on the inner surface of the window due to particulate impacts, extraneous deposition, chemical etching, and the like. Both types of drifts may convolute the OES signal, and degrade quality of optical monitoring.

Inefficiencies and/or inaccuracies may occur due to a lack of in-situ information, particularly as processing equipment ages. For example, after the process shift in a processing chamber occurs over time, inaccurately measured signal can lead to substandard manufacturing output, such as an incorrect deposition amount (e.g., deposition thickness), incorrect amount of removed material (e.g., via etching), incorrect chemical composition of the deposition, or the like. Other processing inefficiencies or inaccuracies can also occur and will be discussed in more detail below.

Embodiments described herein relate to systems and methods for transmission corrections of a plasma OES using optical reflectometry and spectroscopy measurements. The optical reflectometry measurement system may be used in-situ, use an optical wall process sensor (OWPS), and may be combined into a single hardware package. Optical reflectometry measurements may be performed on objects that are located within a processing chamber where conditions and/or process states may change with time. In general, optical reflectometry may be sensitive to conditions of the environment within the processing chamber and to conditions of the window into the processing chamber. Both types of conditions may be affected by process operations, such as deposition, etching (material removal), polishing, and the like. Optical reflectometry measurements may be performed through a transparent window, which may be made of glass, sapphire, quartz, and other suitable materials, of the processing chamber. Transmission and reflection properties of the transparent window may be affected (e.g., degraded) over time.

During process operations, properties of/in the processing chamber, or the environment hosted therein, may change. For example, the processing chamber may contain a plasma or chemical gas, whose physical and/or chemical properties may be passively changing or actively altered during one or more manufacturing processes of a wafer, substrate, or sample performed in the chamber. These may be considered as short timescale drifts.

Such drifts may impact plasma OES, which, if not accurately measured, can affect performance and yield of processed substrates. Both plasma spectra and optical transmission may drift as a function of the number of substrates processed. The measured OES signal is a convolution of these effects. Understanding the root cause of the drift may be difficult due to this convolution. These drifts may be referred to as condition drifts, as they may affect various conditions, such as a roughness of an inner surface of a window of a processing chamber, an environment of the processing chamber, or the like.

Conventional solutions of the condition drift (parameter drift) problem seek to minimize conditions that lead to a drift rather than address consequences of the drift for the accuracy of optical measurements once the drift has developed. However, even though the condition drift may be reduced, it may not be completely eliminated, and thus there is a need for measurement techniques that are accurate despite the presence of the condition drift. Conventionally, an optical sensor measures light that is transmitted from within the processing chamber. Light passing through the window to the optical sensor travels through an environment (which may include a plasma, a chemical gas, or the like) within the processing chamber as well as through the window itself. As the light passes through the environment, its intensity varies due to scattering, absorption, additional plasma emission, or the like). When the light reaches the window, a portion of the light is reflected and a portion of the light is transmitted (e.g., passes) through the window. Thus, the intensity of light that is sensed or measured by the optical sensor depends both on properties of the plasma and the window. Surface properties of the window, such as degradation or roughening, affect the portion of the intensity of the light that is transmitted. As such, the effect of the plasma (short timescale condition drift) and the effect of the surface properties of the window (long timescale condition drift) can be difficult to distinguish.

Aspects and implementation of the instant disclosure include systems and methods that provide for correcting of detected optical signals using optical reflectometry measurements of the properties of the window. Correcting the signal requires understanding the cause(s) of signal drift. Disclosed systems and methods provide for de-convoluting signal drift caused by changes in the plasma environment from artifact changes of the properties of the window.

Aspects and implementations of the instant disclosure more specifically provide for de-convoluting contributions slow and long timescale parameter drifts in a measured optical reflectometry signal. An optical sensor may be located outside of a processing chamber with a window. Two measurements may be taken by the optical sensor: an "on" measurement and an "off" measurement. During an "on" measurement, a light source may direct a probe light with a calibrated reference intensity into the processing chamber through the window of the processing chamber. A portion of the probe light may be transmitted into the processing chamber through the window, while another portion of the probe light may be reflected from the window. The optical sensor located outside the processing chamber measures the reflected intensity. In addition, light may be transmitted from a plasma gas within the processing chamber and through the window. Therefore, during an "on" measurement, the optical sensor measures an "on" intensity corresponding to the sum of the intensity of the reflected portion of the probe light and an intensity of the light transmitted from the plasma gas.

On the other hand, during an "off" measurement, the light source may be turned off, and the optical sensor directly detects the light transmitted from the plasma gas. The intensity of the light transmitted from the plasma gas depends on the intensity of the light incident on the window from the processing chamber as the transmission coefficient of the window.

By using both the "on" measurement and the "off" measurement, the contribution of the window conditions and the contribution of the plasma gas condition on the measured OES signal can be separated. In particular, by subtracting the measured intensity for the "off" measurement from the measured intensity for the "on" measurement, the transmission coefficient of the window can be extracted. Then, the transmission coefficient of the window can be used on conjunction with the measured intensity for the "off" measurement to determine the intensity of light that is incident on the window from the inside of the processing chamber.

Additionally, the same measurements may be performed at various times during the lifetime of the processing chamber. Tracking the changes of the transmission coefficient with time may allow for separating the changes of the window properties caused by short-scale processing occurring in the chamber from long-scale window degradation caused by multiple processing operations.

FIG. 1 is a top schematic view of an example processing system 100, according to one aspect of the disclosure. The processing system 100 includes a transfer chamber robot 101 and a factory interface robot 121 each adapted to pick and place substrates 110 (sometimes referred to as "wafers," "semiconductor wafers," or samples) from or to a destination in an electronic device processing system such as the processing system 100 illustrated in FIG. 1. However, any type of electronic device substrate, mask, or other silica-containing substrate (generally referred to as "substrates" herein) may be conveyed and transferred by the disclosed robots. For example, the destination for the substrates 110 may be one or more processing chambers 103 and/or one or more of the load lock apparatuses 107A, 107B that may be distributed about and coupled to a transfer chamber 114. As shown, substrate transfers may be through slit valves 111, for example.

The processing system 100 may further include a mainframe 102 including the transfer chamber 114 and at least two processing chambers 103. A housing of the mainframe 102 includes the transfer chamber 114 therein. The transfer chamber 114 may include top wall (not shown), bottom wall (floor) 139, and side walls, and, in some embodiments, may be maintained in a vacuum, for example. In the depicted embodiment, the transfer chamber robot 101 is mounted to the bottom wall (floor) 139. However, the transfer chamber robot 101 could be mounted elsewhere, such as to the top wall.

In various embodiments, the processing chambers 103 may be adapted to carry out any number of processes on the substrates 110. The processes may include deposition, oxidation, nitration, etching, polishing, cleaning, lithography, metrology, or the like. Other processes may be carried out as well. The load lock apparatus 107A, 107B may be adapted to interface with a factory interface 117 or other system component, that may receive substrates 110 from substrate carriers 119 (e.g., Front Opening Unified Pods (FOUPs)) that may be docked at load ports of the factory interface 117, for example. The factory interface robot 121 (shown dotted) may be used to transfer the substrates 110 between the substrate carriers 119 and each load lock apparatus 107A, 107B. Transfers of the substrates 110 may be carried out in any sequence or direction. The factory interface robot 121 may be identical (or similar) to the transfer chamber robot 101 in some embodiments, but may further include a mechanism to allow the factory interface robot to move laterally in either lateral direction and indicated by arrow 123. Any other suitable robot may be used as the factory interface robot 121.

In embodiments, and by way of exemplified explanation for any robot, the transfer chamber robot 101 includes at least one arm 113 (e.g., a robot arm) and at least one end effector 115 coupled to the arm 113. The end effector 115 is controllable by the transfer chamber robot 101 in order to pick up a substrate 110 from a load lock apparatus 107A or 107B, guide the substrate 110 through one of the slit valves 111 of a processing chamber 103, and accurately place the substrate 110 onto a substrate support of the processing chamber 103.

In various embodiments, one or more of the processing chambers 103 may include a window 120, at least a part of which is embedded in a wall and liner 124 (e.g., inner wall) of the processing chamber 103. The window 120 may be a transparent crystal that may be made of a transparent ceramic material, or may be made of a transparent material such as sapphire, diamond, quartz, or silicon carbide for example. The window 120 may be characterized by a transmission coefficient, a reflection coefficient, and an absorption coefficient, which may be collectively referred to as optical coefficients. The optical coefficients may depend on factors such as the material of the window 120, surface properties of the window 120, and the like. For example, a brand new window may have a given transmission coefficient (e.g., a reference transmission coefficient), but over time as the window is exposed to various processing operations of the processing chamber, its transmission coefficient may be altered. For example, the transmission coefficient may be changed from the reference transmission coefficient due to an influence of various physical and chemical agents, which may lead to a coating layer that is built up on the OWPS, which can subsequently affect its sensor properties. Additionally, in some embodiments, the window 120 may be pre-coated, e.g., permanently, with a first film. The first film may be disposed on the inner surface of the window 120 and may have a composition that matches chemical properties of the chamber. During operation of the chamber, e.g., in the course of performance of process operations, a second film may be deposited and subsequently (e.g., gradually) removed over time. As such, the transmission coefficient of the second film may vary as a function of time, which changes the measured light intensity transmitted from the environment of the processing chamber and changes the measured plasma spectra. In such implementations, as described below with respect to FIG. 3A, the reference measurements may be performed after the first film is deposited on the window 120 (e.g., during manufacturing of the window 120) and before the window is coated with the second film.

In various embodiments, an environment of one or more of the processing chambers 103 may contain a plasma. The plasma may be affected by processing operations of the processing chamber, which may lead to changes in the optical properties of the plasma. Optical changes of the plasma may affect the intensity of the light that is incident on the window 120 from the environment of the processing chamber. Changes of the optical properties of the window 120 as well as the environment of the processing chamber 103 may be observed by one or more optical sensors, such as optical sensor 125. The environment of the processing chamber 103 may be produced in a course of the processing operation that may be performed in the processing chamber. The processing operation may be one factor that causes the transmission coefficient of the window 120 to change from the reference transmission coefficient. The systems and methods described allow for transmission correction of such effects.

In various embodiments, the processing system 100 may include a light source (not illustrated in FIG. 1). The light source may be used as a probe light. The intensity of the probe light may be calibrated to a known and predetermined reference value. During a detection stage, the optical sensor 125 detects the light coming from the processing chamber environment. During a testing stage, the light source may direct a probe light into the processing chamber 103 through window 120. Accordingly, the optical sensor 125 can be collecting both the light coming from the processing chamber environment and the portion of the probe light reflected from the window In other embodiments, the probe light may be a broadband light (e.g., a spectral range of the wavelength is on the order of a center wavelength, or δλ~λ). In some embodiments, the light source may be a pulsed light source that is configured to turn off and on at regular intervals. In some embodiments, the light source may be controlled (e.g., by a controller device) to turn off and on based on instructions.

In some embodiments, light, such as the probe light and/or light used for an optical reflectometry measurement, may be collimated, partially reflected and partially transmitted through the window 120, as will be discussed in more detail with reference to FIGS. 2-4. In some embodiments, the processing system 100 may further include a light-coupling device. The light-coupling device may be coupled to one or more of the optical sensor 125 or the light source. The light-coupling device may cause reflected light to be focused into an opening of a fiber optic cable that may be coupled to an optical sensor 125. The light-coupling device may be configured to deliver the probe light from the light source to the window. The light-coupling device may be further configured to deliver the light reflected from the window (during the testing stage) and the light transmitted through the window (during both the detection stage and the testing stage) from the window to the optical sensor 125.

A controller 109 (e.g., a tool and equipment controller) may control various aspects of the processing system 100, e.g., gas pressure in the processing chamber 103, individual gas flows, spatial flow ratios, temperature of various chamber components, and radio frequency (RF) or electrical state of the processing chamber 103. The controller 109 may receive signals from and send commands to the factory interface robot 121, the transfer chamber robot 101, one or more sensors, and/or other processing components of the processing system 100. The controller 109 may thus control the initiation and cessation of processing, may adjust a deposition rate, type or mix of deposition composition, and the like. The controller 109 may further receive and process sensing data from various sensors.

In various embodiments, processing device 130 is coupled to the optical sensor 125 and/or a light source (not illustrated in FIG. 1). The processing device 130 may be configured to receive and process sensing data, such as for optical reflectometry measurements, including the intensity of the light during detection and testing stages obtained by the optical sensor 125. The processing device 130 may calculate or determine the transmission coefficient of the window 120 using the difference of intensities of light detected during the testing stage and the detection stage. The processing device 130 may then determine an intensity of the light incident on the window 120 from the environment using the intensity detected during the detection stage and the determined transmission coefficient of the window 120.

The processing device 130 may be and/or include a computing device such as a personal computer, a server computer, a programmable logic controller (PLC), a microcontroller, and so on. The processing device 130 may include (or be) one or more processing devices, which may be general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices such as an application specific integrated circuit (ASIC), a field programmable gate array (FPGA), a digital signal processor (DSP), network processor, or the like. The processing device 130 may include a data storage device (e.g., one or more disk drives and/or solid state drives), a main memory, a static memory, a network interface, and/or other components. The processing device 130 may execute instructions to perform any one or more of the methodologies and/or embodiments described herein. The instructions may be stored on a computer readable storage medium, which may include the main memory, static memory, secondary storage and/or processing device (during execution of the instructions).

Figure 2:
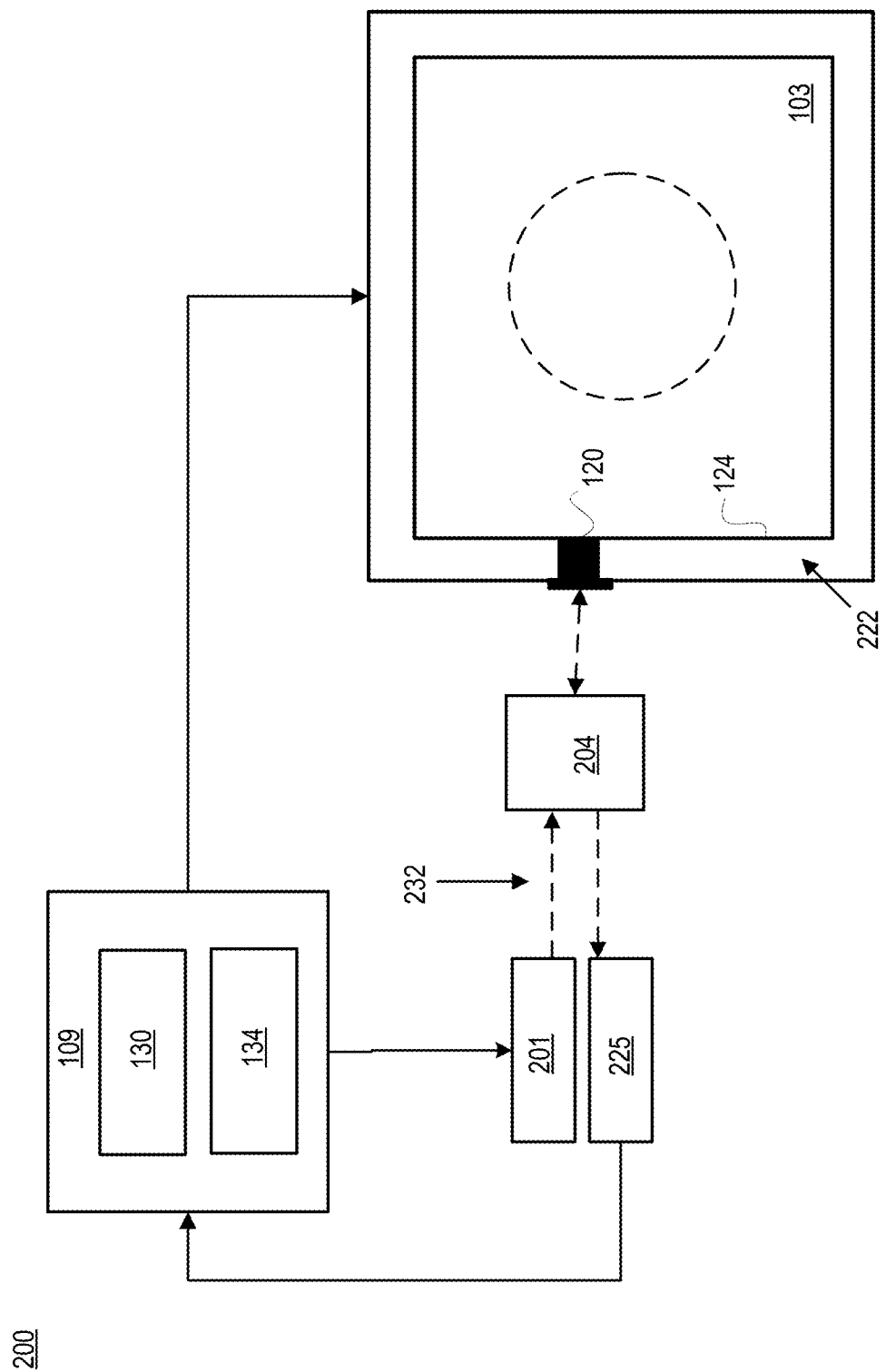
FIG. 2 illustrates a simplified side view of a system for optical reflectometry correction, according to an embodiment.

FIG. 2 illustrates a simplified side view of a system 200 for optical reflectometry correction, according to an embodiment. The system 200 may include, for example, the processing chamber 103, which has the liner 124, as was illustrated in FIG. 1. The processing chamber 103 may include a wall 222 to which the liner 124 is attached. The liner 124 may be specially designed to have high chemical resistance to the process chemistries that minimize physical or chemical change to the liner in order to maximize lifetime. Furthermore, at least part of the window 120 may be embedded within the wall 222 and the liner 124, as illustrated. The window 120 may be made of transparent ceramic material, or may be made of a durable transparent material such as sapphire, diamond, quartz, silicon carbide, or a combination thereof.

In embodiments, the system 200 further includes a light source 201 (e.g., a broadband light source,), a light-coupling device 204 (e.g., a collimator, a waveguide, an optical fiber, a mirror, or any combination thereof), an optical sensor 225, the controller 109, and the processing device 130. The light source 201 and optical sensor 225 may be optically coupled to the light-coupling device 204 through one or more fiber optic cable 232.

In an embodiment, the light source 201 is configured to turn on and off. For example, the light source 201 may be a pulsed light source to turn on and off to selectively direct a probe light into the processing chamber 103. In some embodiments, light source 201 may be a continuous light source. In some embodiments, the light source 201 may be a flash lamp, such as a pulsed Xenon source. In other embodiments, the wavelength range may further vary, for example, and may be set around near infrared wavelengths. Additional or different embodiments are envisioned for a light source 201 with varying capabilities and wavelengths. In some embodiments, the light source 201 may generate broadband light.

In various embodiments, the light-coupling device 204 may be adapted to collimate or otherwise transmit light in two directions along an optical path. A first direction may include light from the light source 201 that is to be collimated and transmitted into the processing chamber 103 through the window 120. A second direction may be a direction of reflected light from the window 120 that passes back into the light-coupling device 204. The reflected light may be focused into the fiber optic cable 232 and thus directed to the optical sensor 225 in the second direction along the optical path. Further, the fiber optic cable 232 may be coupled between the optical sensor 225 and the light source 201 for efficient transfer of light between the light source 201, to the window 120, and back to the optical sensor 225. In some embodiments, the light-coupling device 204 may deliver the probe light from the light source 201 to the window 120 and similarly to deliver the first light and/or the second light from the window 120 to the optical sensor 225.

In some embodiments, the optical sensor may be a spectrometer, a CCD camera, or the like. The optical sensor 225 may need calibration at the same schedule or longer compared to the light source 201. The optical sensor 225 may be adapted to detect a spectrum of the reflected light received from the light-coupling device 204, e.g., the light that has reflected back from the window 120 and been focused by the light-coupling device 204 into the fiber optic cable 232 as well as optical emission from the environment of the chamber.

In various embodiments, the controller 109 includes or is coupled to the processing device 130 and includes or is coupled to a memory 134 or other computer storage. The processing device 130 may be coupled to both the light source 201, the optical sensor 225, and the processing chamber 103. The processing device 130 may direct the light source 201 to flash on and then receive the first spectrum (e.g., a dependence of light intensity on the wavelength $I_1$ (IL)) from the optical sensor 225. The processing device 130 may also keep the light source off and receive a second spectrum (e.g., $I_2(\lambda)$) from the optical sensor 225 when the light source 201 is off. The second spectrum may represent the OES of the plasma or chemical process within the processing chamber. The processing device 130 may subtract the second spectrum from the first spectrum to determine the reflectometry signal (e.g., $I_1(\lambda)-I_2(\lambda)$) for a moment in time. The processing device 130 may then mathematically fit the reflectometry signal $I_1(\lambda)-I_2(\lambda)$ to one or more thin film models to determine one or more optical thin film properties of the process film layer that is deposited on the window 120.

The processing device 130 may further be configured to determine a transmission coefficient of the window 120. The processing device 130 may determine the transmission coefficient by determining a difference between the first spectrum corresponding to an intensity measured by the optical sensor 225 when the light source 201 is on and the second spectrum corresponding to an intensity value measured by the optical sensor 225 when the light source 201 is off.

Figure 3B:
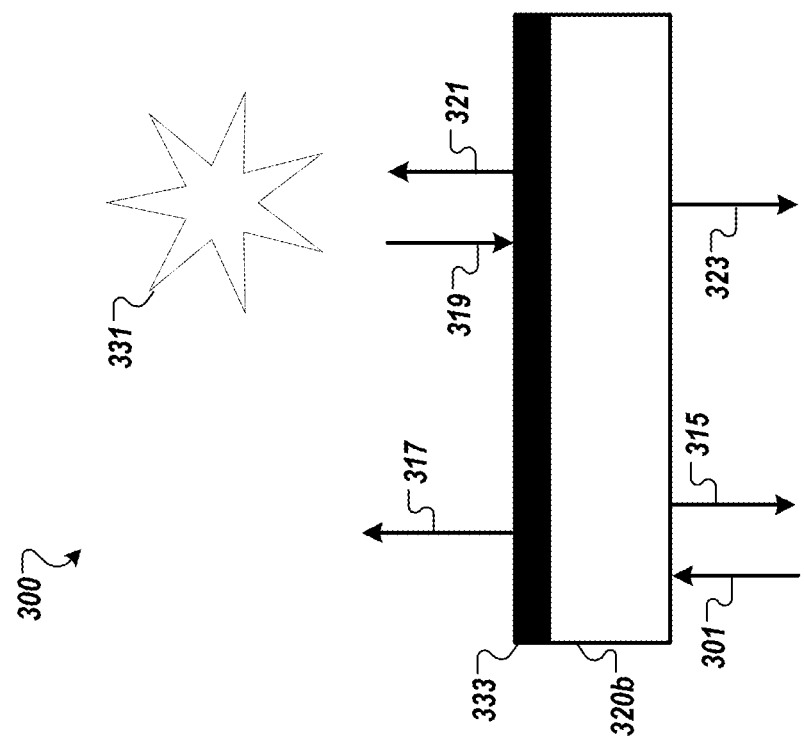
FIG. 3B is a schematic of the system for transmission correction of a plasma OES, according to an embodiment.
Figure 3A:
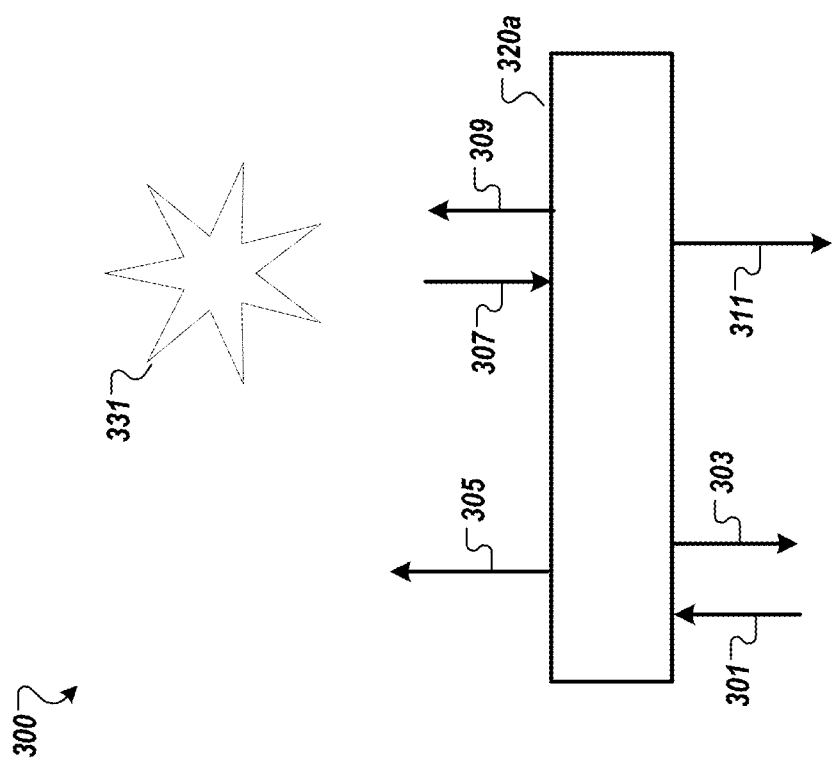
FIG. 3A is a schematic of a system at an initial time for a reference measurement for transmission correction of a plasma optical emission signal (OES), according to an embodiment.

FIG. 3A is a schematic of a system 300 at an initial time for a reference measurement for transmission correction of a plasma OES, according to an embodiment. Although not all of the components are shown, the system 300 may be the same as or similar to the system 100 of FIG. 1 and the system 200 of FIG. 2. The system 300 may include a window 320a. The window 320a may be a window of a processing chamber for optical inspection and reflectometry measurements. The window 320a may be a window of a processing chamber that has not yet been used for any substrate, wafer, or sample manufacturing, and thus has not yet been exposed to any materials used for processing operations such as deposition, etching, polishing, or the like. The window 320a may be used to obtain reference measurements which may be affected by a coating from the OWPS.

The window 320a may be permanently pre-coated (e.g., during a manufacture of the window 320a) with a first thin film, which matches the chemical properties of the processing chamber. The reference measurements that are obtained include optical coefficients of both the window 320a and the first thin film.

The system 300 may include a probe light 301 and a chamber light 307. The probe light 301 may be generated by a light source external to the processing chamber. The probe light 301 may have an intensity L that may be known, e.g., via a reference calibration. The chamber light 307 may be light that is transmitted from an environment of the processing chamber through the window 320a. The chamber light 307 may have an intensity $I_1$ that is incident on the window 320a from the inside of the processing chamber, and that may depend on the environment of the processing chamber. For example, properties of plasma 331 within the processing chamber may depend on whether there is a processing operation, the nature of the processing operation is (e.g., deposition, etching, polishing, or the like), etc. The chamber light 307 may travel through the plasma 331 within the processing chamber. Both the probe light 301 and the chamber light 307 may be incident on the window 320a normal to a surface of the window 320a.

In general, it is worth noting that in the absence of absorption (or in a case where absorption can be neglected), the sum of a reflection coefficient and a transmission coefficient is unity: R+T=I. Further, the transmission and the reflection coefficients are independent of which side of the window the light is incident from.

At least two reference measurements may be obtained by a sensor that may be located externally from the processing chamber. A first reference measurement may be obtained when the probe light 301 is on. The measured intensity is $I_{ref}^{on}=L \cdot R_1+I_1 \cdot T_1=L \cdot (1-T_1)+I_1 \cdot T_1$, where $L \cdot R_1$ is the intensity of reflected portion 303 of probe light 301 and h T 1 the is intensity of transmitted portion 311 of chamber light 307. A second reference measurement may be obtained when the probe light 301 is off. The measured intensity is $I_{ref}^{off}=I_1 \cdot T_1$. A processing device coupled to the sensor may determine the reference transmission coefficient $T_1$ of the window 320a by determining a difference between the first measurement and the second measurement:

$$I_{ref}^{on} - I_{ref}^{off} = L(1-T_1)$$

and thus $$T_1 = 1 - \frac{I_{ref}^{on} - I_{ref}^{off}}{L}.$$

Subsequently, using the determined reference transmission coefficient $T_1$, the processing device may be capable of inferring the intensity $I_1$ of the chamber light 307 incident on the window 320a from the intensity of light 311 transmitted through the window. More specifically, $$I_1 = \frac{I_{ref}^{off}}{T_1}.$$

This formula is accurate provided that the actual transmission coefficient of the window is well approximated by the value $T_1$. In the course of substrate processing, the actual transmission coefficient of the window $T_2$ can become different from $T_1$.

FIG. 3B is a schematic of the system 300 for transmission correction of a plasma OES, according to an embodiment. There can be a number of factors that require correction to obtain an accurate plasma OES. In particular the plasma OES can be affected by changes in the plasma 331b within the environment of the processing chamber as well as surface degradation of the window 320b. As depicted in FIG. 3B, the window 320b is the same as the window 320a except the window 320b has been subjected to many processing operations and an inner surface of the window 320b is roughened by deposition, etching, age, etc. The changes to the inner surface of the window 320b may happen on long timescales, such as on the order of the time it takes for many processing operations to be done. Changes to the inner surface of the window 320b may cause a surface layer 333 to exist. The surface layer 333 can be caused by long-term changes to the window 320b, which can include surface roughness, penetration or particles, cracks in the surface of the window 320b, as well as short-term changes to the window 320b, which can include short-term matter deposition and the like. In addition, a second thin film may be present on the window 320b over the first thin film layer as described with respect to FIG. 3A. The second thin film may have a variable thickness, e.g., the second thin film may be added, thickened, thinned, and/or removed by processing operations within the processing chamber. Because the reference measurement accounts for optical properties of the window and the first thin film, the results of the measurements, as described below, can be used to compensate for the variable thickness and optical properties of the second thin film.

During a processing operation, the plasma 331b within the environment of the processing chamber may itself be changing. For example, the sample may undergo various plasma-based processing. In some cases, the processing chamber may undergo a cleaning process which may also require a plasma process. These plasma effects affect the light that is transmitted from the environment of the processing chamber through the window 320b.

The window effects and the plasma effects both affect the light received by the sensor compared to the reference case of FIG. 3A. The system and methods described offer a solution for differentiating between whether the change in intensity of light received by the sensor is due to a change of the intensity of light incident on the inner surface of the window (e.g., plasma effects) or is due to a change of the inner surface of the window (window effects).

As in the case of FIG. 3A, at least two measurements may be obtained by the sensor. A first measurement may be obtained when the probe light 301 is on. A transmitted portion 317 of the probe light 301 with an intensity of $LT_2$ may be transmitted through the window 320b (into the processing chamber) while a reflected portion 315 of the probe light 301 with an intensity of $LR_2$ may be reflected back by the window 320b and toward the sensor, where $T_2$ and $R_2$ are the transmission and reflection coefficients of the window 320b respectively. Additionally, a chamber light 319 may be produced from the environment of the processing chamber and may be incident on the window 320b with an intensity $I_2$ from inside of the processing chamber. A portion 321 of the chamber light 319 is reflected from the window 320b and a portion 323 of the chamber light 319 is transmitted through the window 320b. (The intensity $I_2$ of the chamber light 319 that is incident on the window 320b in FIG. 3B may differ from the intensity $I_1$ of the chamber light 307 that is incident on the window 320a in FIG. 3A due to the plasma 331 being changed or being different in the two cases.) In this case, as before, the sensor can obtain a first measurement:

$$I^{on} = L(1-T_2) + I_2 T_2$$

as well as a second measurement:

$$I^{off} = I_2 T_2.$$

The processing device can determine the new transmission coefficient of the window:

$$T_2 = 1 - \frac{I^{on} - I^{off}}{L}.$$

Subsequently, the processing device may determine the intensity of the chamber light 319 that is incident on the window 320a using the second measurement and the transmission coefficient. More specifically, $$I_2 = \frac{I^{off}}{T_2}.$$

By comparing $I_2$ to $I_1$, a change in the chamber light that is incident on the window 320b from the environment of the processing chamber can be determined, providing information about the changes in the plasma 331b. Subsequently, the change that remains unaccounted for may be attributed to window effects. Once the transmission coefficient $T_2$ characterizing a current state of the window is determined, the determined transmission coefficient can be used in conjunction with the reference transmission coefficient $T_1$ for determining conditions in the environment of the processing chamber. For example, it may be known (e.g., from empirical testing, physical and/or chemical modeling, or any combination thereof) that a particular technological process is associated with the environment that produces a light intensity $i_1$, as detected by the optical sensor, when the window is characterized by the reference transmission coefficient $T_1$ (referred to herein as a reference window, which may be a new window, a cleaned window, etc.). This means that the intensity of the light incident on the reference window is $i_1/T_1$. If, during performance of the technological process the sensor detects intensity $i_2$ whereas the pulsed reflectometry measurement detect that the transmission coefficient of the current window is $T_2$, the processing device may determine that the intensity of the light incident from the current environment of the processing chamber is $i_2/T_2$. The processing device may, therefore, determine an incident intensity mismatch parameter $$x = \frac{i_2 T_1}{i_1 T_2},$$

that indicates how strongly the conditions of the environment deviate from the target conditions.

Similarly, in one embodiment, In further embodiments, the measurements may be performed over a range of wavelengths of interest, e.g., using broadband light sources and broadband sensors. For example, during the testing stage the processing device 130 may detect the intensity of light during (e.g., $L(1-T_2)+I_2T_2$) for each wavelength of a set of wavelengths (e.g., within a wavelength interval $[\lambda_1, \lambda_2]$). During the detection stage, the processing device 130 may similarly detect the intensity (e.g., $I_2T_2$) of the light for each wavelength of the set of wavelengths. Based on the two intensities, the processing device 130 may determine the transmission coefficients of the window for each respective wavelength.

The intensity mismatch parameter may then be determined as a function of wavelength, intensity mismatch parameter, $x$ ($\lambda$). Such a wavelength-resolved mismatch parameter may be used to detect a proper composition of the environment of the processing chamber. For example, a mismatch particular for a specific wavelength (e.g., corresponding to emission wavelength of a specific chemical A) may indicate that chemical A is present in too low (too high) concentration in the current environment of the processing chamber.

In some embodiments, light that is incident from the environment within the processing chamber may be diffuse (either inherently or due to scattering within the environment, by gases, plasma, or the like) and a directional light selector such as a collimator may be used to select for or direct light that is incident substantially perpendicularly to the inner surface of the window (e.g., between 0 degrees and 10 degrees from a normal to the surface of the window). In some embodiments, the first light and the second light may be incident on the window 320a at a non-normal angle.

In some embodiments, measurements described above may be performed in a time domain. For example, the transmission coefficient of the window $T_2(t)$ may depend on time (e.g., as some materials from the processing chamber land on the window) leading to the drift of the measured intensity with time $i_2(t)$. By repeatedly determining the current transmission coefficient of the window, e.g., at regular time intervals, the processing device 130 may determine whether the conditions inside the processing chamber remain appropriate (e.g., consistent with the specification of the processing operation performed therein).

Figure 4:
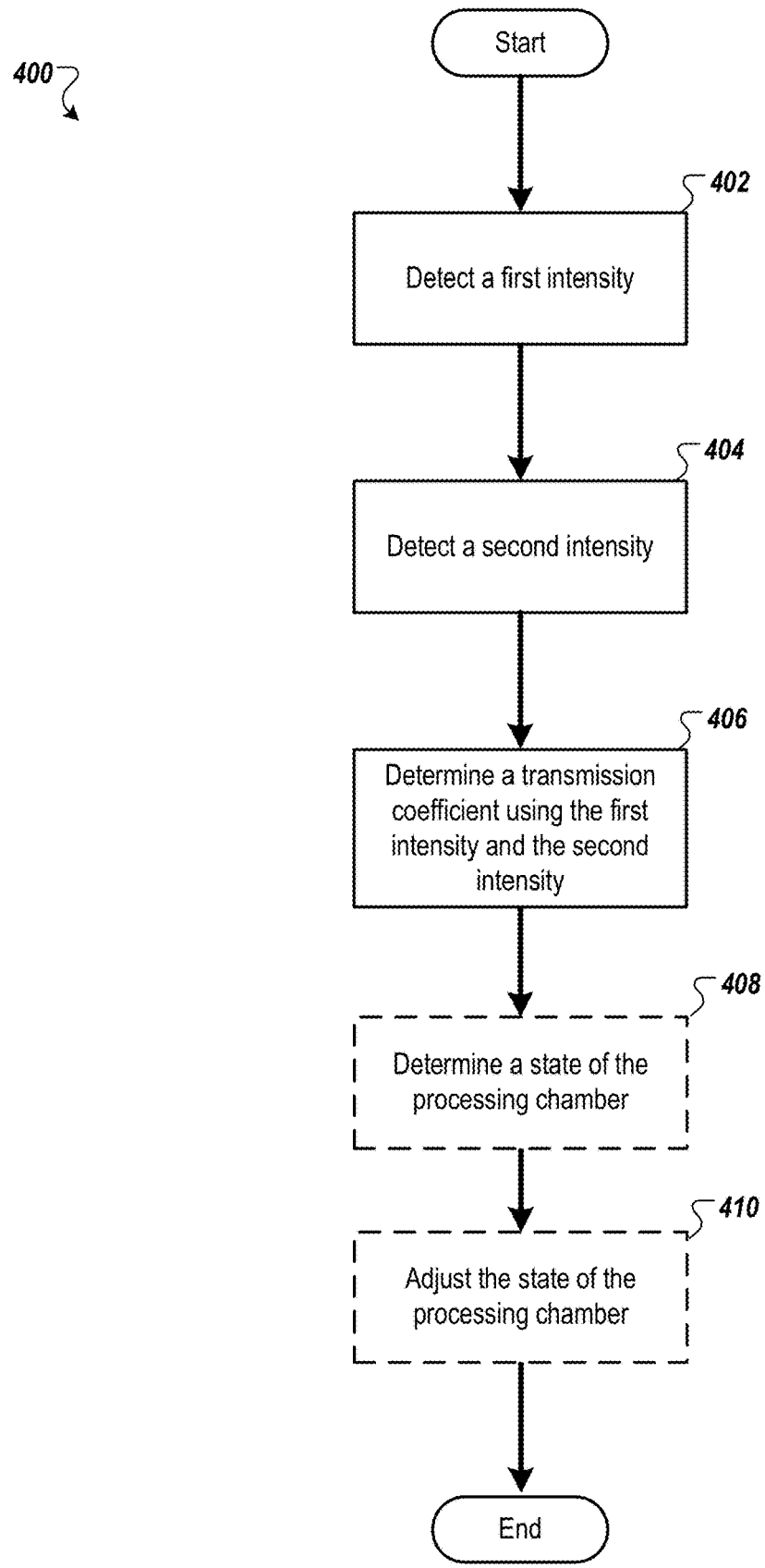
FIG. 4 is a flow diagram of a method for transmission correction of a plasma OES using an optical reflectometry measurement, according to an embodiment. In some embodiments, processing logic may be used to perform the method.

FIG. 4 is a flow diagram of a method 400 for transmission correction of a plasma OES using an optical reflectometry measurement, according to an embodiment. In some embodiments, processing logic may be used to perform the method 400. The processing logic may include hardware, software, or any combination thereof. The method 400 may be performed using systems and components shown in FIG. 1 and FIG. 2 or some combination thereof. Some or all blocks of the method 400 may be performed responsive to instructions from a computing device or a microcontroller, in some embodiments. The microcontroller may include one or more processing devices, such as central processing units (CPUs), application-specific integrated circuits (ASICs), field programmable gate arrays (FPGAs), digital signal processors (DSPs), network processors, or the like. The processing device(s) is (are) communicatively coupled to one or more memory devices, such as read-only memory (ROM), flash memory, static memory, dynamic random access memory (DRAM), and the like. The microcontroller can be a part of a desktop computer, a laptop computer, a workstation, a wearable device (e.g., a tablet, a smart phone, etc.), a cloud-based computing service, and the like. In some embodiments, the microcontroller is a part of a larger network of computing devices. In some embodiments, an outside computing device communicating with the microcontroller is capable of reconfiguring (e.g., changing settings, updating memory, or otherwise reprogramming) the microcontroller The method 400 may begin with the processing logic detecting a first intensity (block 402). The first intensity may correspond to a first light, which includes a portion of a probe light (e.g., with intensity $LR=L(1-T)$) that is reflected from a window of a processing chamber and a light (e.g., with intensity IT) that is transmitted from an environment of the processing chamber through the window. Accordingly, the intensity of the first light can be $L(1-T)+IT$ The processing logic may detect the first intensity during a first time when the probe light is directed into the processing chamber through the window. The processing logic may detect a second intensity of a second light (block 404). The second light may include light transmitted from the environment of the processing chamber through the window (e.g., with intensity IT)). The processing logic may detect the second intensity during a second time when probe light is ceased to be directed into the processing chamber through the window. The processing logic may determine a transmission coefficient of the window using the first intensity and the second intensity (block 406).

To determine the transmission coefficient of the window, the processing logic may determine a difference (e.g., $\Delta I$) between the first intensity and the second intensity (e.g., $\Delta I=L(1-T)$). Correspondingly, using the measured difference $\Delta I$ and a known (e.g., from calibration measurements) intensity L of the probe light, the processing logic performing method 400 may determine the transmission coefficient of the window in its current state. The processing logic may further determine an intensity of the light that is incident on the window from the environment of the processing chamber. The processing logic may determine that intensity using the second intensity and the transmission coefficient of the window. The environment of the processing chamber may include a plasma or other chemical gas.

The processing logic may direct the probe light such that it is incident perpendicular to the surface of the window. Further the processing logic may make measurements of light produced from the environment that is incident perpendicular to the surface of the window.

The processing light may determine the transmission coefficient of the window and/or the intensity of the light transmitted from the environment for a single frequency or over a range of frequencies, and thus obtain each value as a function of frequency.

In further embodiments, the processing logic may determine, based on the transmission coefficient T of the window, a state of the processing chamber (block 408). For example, a large discrepancy between the reference transmission coefficient and a transmission coefficient at any given time may indicate that the window is subject to surface roughening, particle impact, changes in the environment of the processing chamber, aging, etc. Additionally, the processing logic may determine based on the intensity of the light incident on the window by the environment of the processing chamber, a state of the environment of the processing chamber. A discrepancy between the reference intensity of the light incident on the window and the intensity of the light at any given time may provide information about a processing operation. In either or both of these cases, the processing logic can adjust the state of the processing chamber based on determined differences between reference values and values at later times (block 410).

Figure 5:
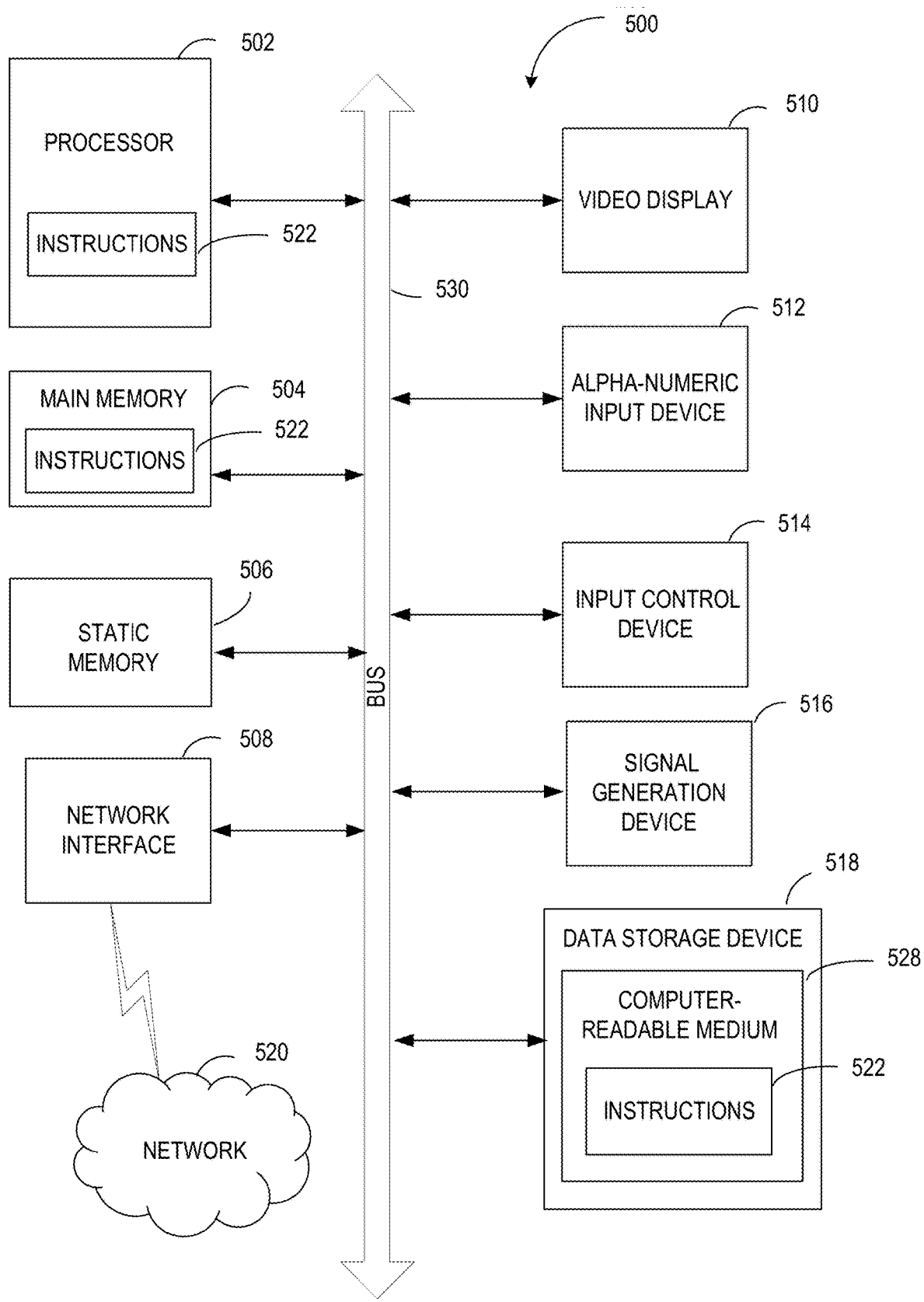
FIG. 5 depicts a block diagram of an example processing device operating in accordance with one or more aspects of the present disclosure.

FIG. 5 depicts a block diagram of an example processing device 500 operating in accordance with one or more aspects of the present disclosure. The processing device 500 may be the controller 109 of FIG. 1.

Example processing device 500 may be connected to other processing devices in a local area network (LAN), an intranet, an extranet, and/or the Internet. The processing device 500 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 500 may include a processor 502 (e.g., a CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processor 502 represents one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 502 may be configured to execute instructions implementing method 400 of thickness variation mapping.

Example processing device 500 may further comprise a network interface device 508, which may be communicatively coupled to a network 520. Example processing device 500 may further comprise a video display 510 (e.g., a liquid crystal display (LCD), a touch screen, or a cathode ray tube (CRT)), an alphanumeric input device 512 (e.g., a keyboard), an input control device 514 (e.g., a cursor control device, a touch-screen control device, a mouse), and a signal generation device 516 (e.g., an acoustic speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions implementing method 400 of thickness variation mapping.

Executable instructions 522 may also reside, completely or at least partially, within main memory 504 and/or within processor 502 during execution thereof by example processing device 500, main memory 504 and processor 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The embodiments of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

The preceding description sets forth numerous specific details such as examples of specific systems, components, methods, and so forth in order to provide a good understanding of several embodiments of the present disclosure.

It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
    a light source configured to:
        direct, during a first time, a probe light into a processing chamber through a window; and
        cease, during a second time, directing the probe light into the processing chamber through the window;
    an optical sensor configured to:
        detect, during the first time, a first intensity of a first light, the first light comprising a portion of the probe light reflected from the window and a light transmitted from an environment of the processing chamber through the window; and
        detect, during the second time, a second intensity of a second light, the second light comprising the light transmitted from the environment of the processing chamber through the window; and
    a processing device communicatively coupled to the optical sensor, the processing device configured to:
        determine, using the first intensity and the second intensity, a transmission coefficient of the window.

2. The system of claim 1, wherein to determine the transmission coefficient of the window, the processing device is to determine a difference between the first intensity and the second intensity.

3. The system of claim 1, wherein the processing device is further configured to determine, using the second intensity and the transmission coefficient of the window, an intensity of light incident on the window from the environment of the processing chamber.

4. The system of claim 1, wherein the environment of the processing chamber is produced in a course of a processing operation performed in the processing chamber, and wherein the processing device is further configured to:
    determine a change of the transmission coefficient, caused by the processing operation, from a reference transmission coefficient of the window.

5. The system of claim 1, further comprising a light-coupling device to deliver the probe light from the light source to the window.

6. The system of claim 5, wherein the light-coupling device is further to deliver the first light from the window to the optical sensor.

7. The system of claim 5, wherein the environment of the processing chamber comprises a plasma.

8. The system of claim 5, further comprising a collimator to direct the light transmitted from the environment perpendicularly to a surface of the window.

9. The system of claim 1, wherein the probe light is incident on the window substantially perpendicularly to a surface of the window.

10. The system of claim 1, wherein an intensity of the probe light is calibrated to a predetermined reference intensity value.

11. The system of claim 1, wherein the probe light is a broadband light.

12. A system comprising:
    a processing chamber comprising:
        a window; and
        a plasma gas within an environment of the processing chamber;
    an optical sensor configured to:
        detect a first intensity of a first light, the first light comprising i) a portion of a probe light reflected from the window and ii) a light transmitted from the environment of the processing chamber through the window; and
        detect a second intensity of a second light, the second light comprising the light transmitted from the environment of the processing chamber through the window; and
    a processing device communicatively coupled to the optical sensor, the processing device configured to:
        determine a transmission coefficient of the window using the first intensity and the second intensity.

13. The system of claim 12, further comprising a light source configured to:
    direct, during a first time, the probe light into the processing chamber through the window; and
    cease, during a second time, directing the probe light into the processing chamber through the window, wherein the first intensity of the first light is detected during the first time and the second intensity of the second light is detected during the second time.

14. The system of claim 12, wherein the processing device is further configured to determine, using the second intensity and the transmission coefficient of the window, an intensity of light incident on the window from the environment of the processing chamber.

15. The system of claim 12, wherein an intensity of the probe light is calibrated to a predetermined reference intensity value.

16. A method comprising:
    detecting a first intensity of a first light, the first light comprising i) a portion of a probe light reflected from a window of a processing chamber and ii) a light transmitted from an environment of the processing chamber through the window;

detecting a second intensity of a second light, the second light comprising the light transmitted from the environment of the processing chamber through the window; and determining a transmission coefficient of the window using the first intensity and the second intensity.

17. The method of claim 16, further comprising:
during a first time, directing the probe light into the processing chamber through the window; and
during a second time, ceasing to direct the probe light into the processing chamber through the window, wherein the first intensity of the first light is detected during the first time and the second intensity of the second light is detected during the second time.

18. The method of claim 16, wherein determining the transmission coefficient of the window comprises determining a difference between the first intensity and the second intensity.

19. The method of claim 16, further comprising determining, using the second intensity and the transmission coefficient of the window, an intensity of light incident on the window from the environment of the processing chamber.

20. The method of claim 16, wherein the probe light is incident on the window substantially perpendicularly to a surface of the window and the light transmitted from the environment is directed by a collimator to be incident on the window perpendicularly to the surface of the window.

21. The method of claim 16, further comprising:
detecting the first intensity of the first light for each of a plurality of frequencies;
detecting the second intensity of the second light for each of the plurality of frequencies; and
determining the transmission coefficient of the window for each of the plurality of frequencies using the first intensity and the second intensity detected for a respective frequency.

* * * * *